United States Patent [19]
Bergum et al.

[11] 3,870,566
[45] Mar. 11, 1975

[54] BATTERY HAVING VENTING PASSAGEWAY OUTSIDE OF OR IN GAS-PERVIOUS LAYERS

[75] Inventors: Bernard C. Bergum; Tor Oppedal, both of Madison, Wis.

[73] Assignee: ESB Incorporated, Philadelphia, Pa.

[22] Filed: Dec. 3, 1973

[21] Appl. No.: 421,159

[52] U.S. Cl. ................................ 136/111, 136/177
[51] Int. Cl. ........................................... H01m 1/06
[58] Field of Search ............ 136/111, 177, 132–133, 136/147, 163, 166–170, 169–170, 180, 107

[56] References Cited
UNITED STATES PATENTS

| | | | |
|---|---|---|---|
| 2,632,784 | 3/1953 | Marsal et al. | 136/133 |
| 2,870,235 | 1/1959 | Soltis | 136/111 |
| 3,647,557 | 3/1972 | Kegelman | 136/177 |
| 3,741,814 | 6/1973 | Bilhorn | 136/111 |

Primary Examiner—Anthony Skapars

[57] ABSTRACT

A battery is provided with a passageway for the venting of gases generated by the cell. The passageway is outside of or in a gas-pervious layer of the cell enclosure, and gases travel between the interior of the cell and the passageway by first passing through the gas-pervious layer. The passageway may be the center of a hollow, gas-pervious fiber. Alternatively, a fiber may be in a passageway between the unlaminated surfaces of an inner gas-pervious layer and an outer layer which is impervious to liquids and less pervious than the inner layer to the gases generated by the cell. The gas-pervious layer may be (i) on the outside face of an end cell of the battery to provide a terminal vent, (ii) situated within a gas-pervious adhesive, or (iii) situated between the cells of a multicell battery.

19 Claims, 16 Drawing Figures

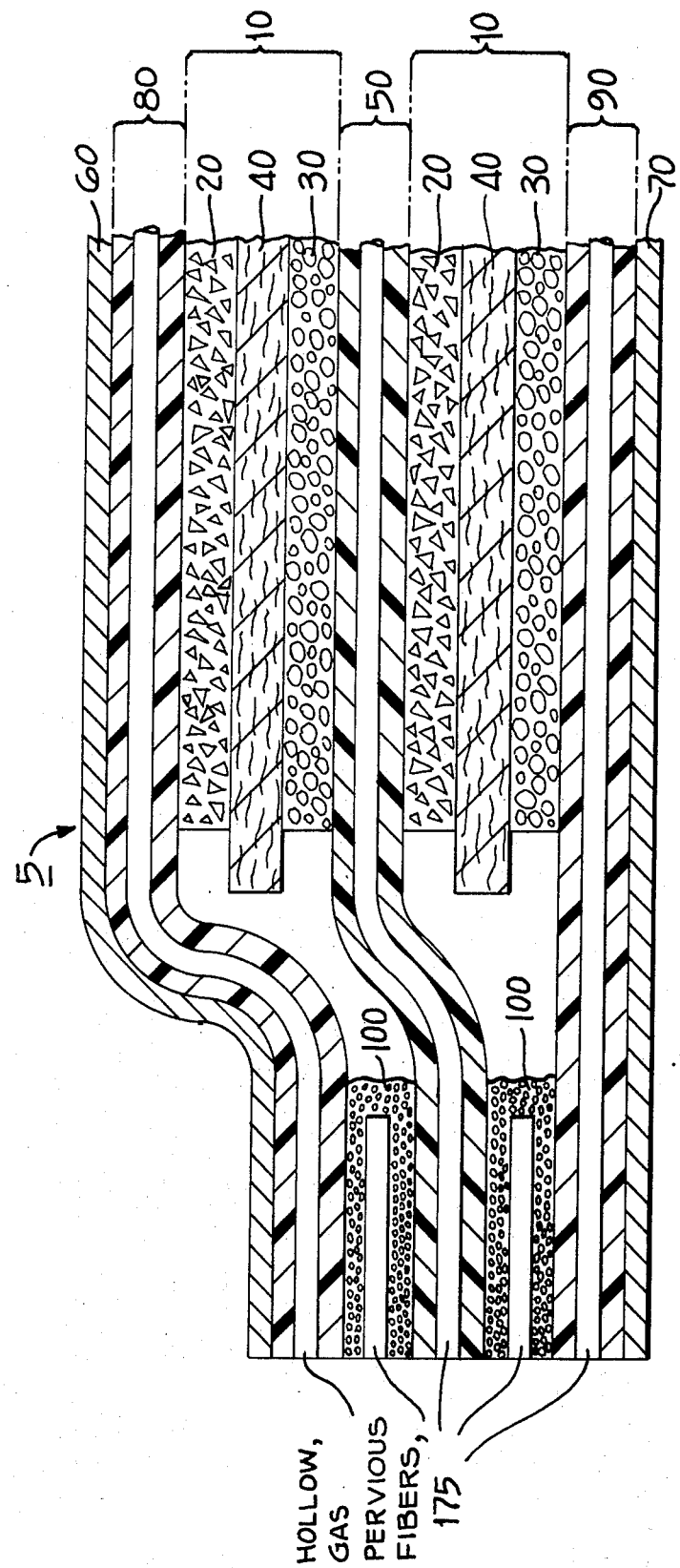

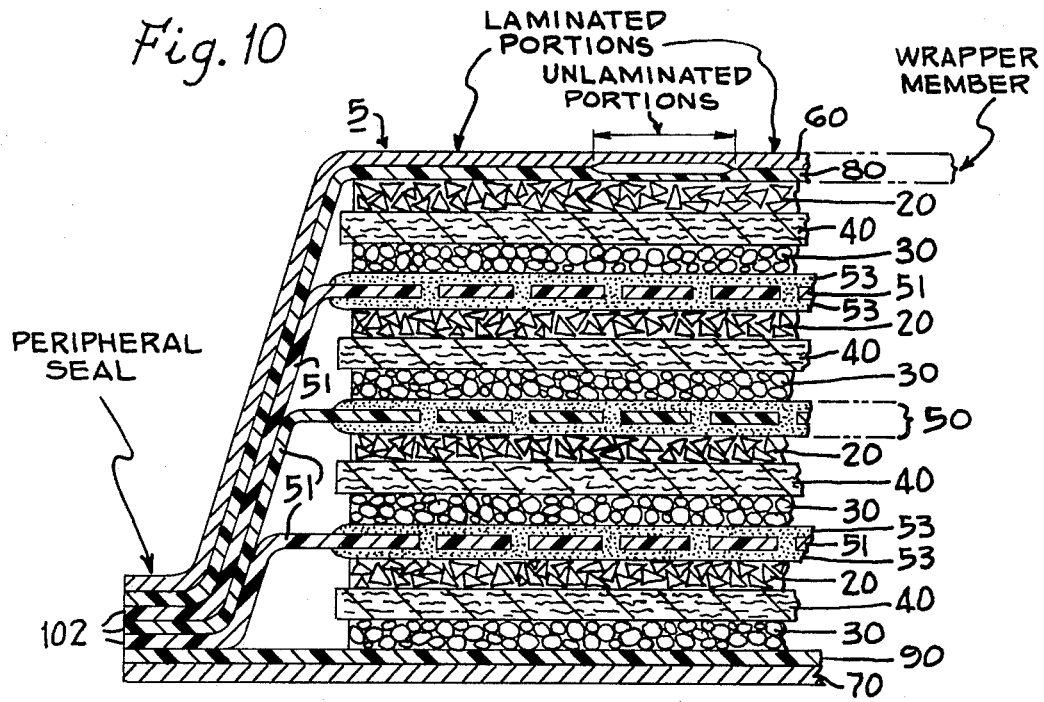
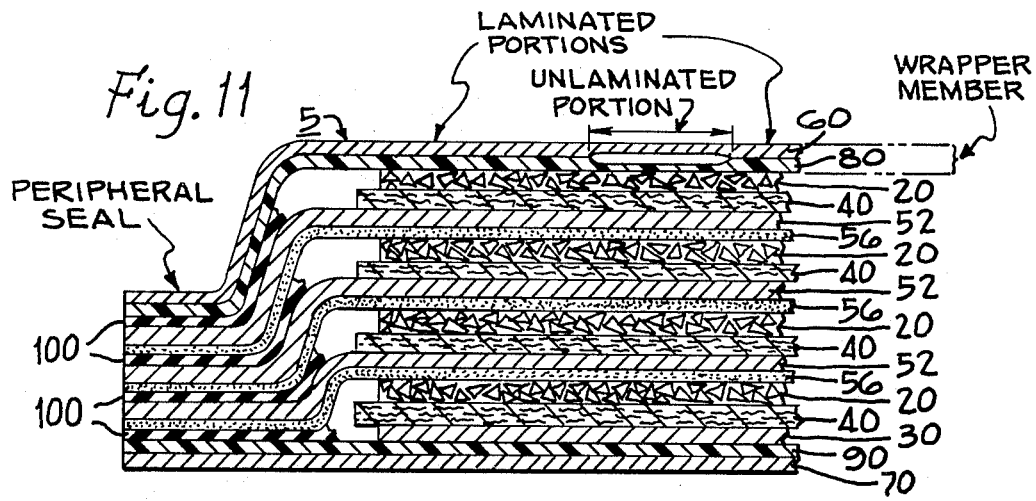
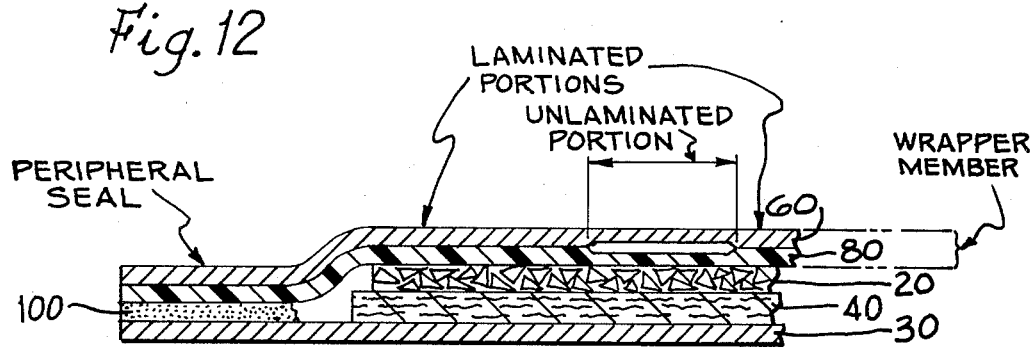

BATTERY HAVING VENTING PASSAGEWAY OUTSIDE OF OR IN GAS-PERVIOUS LAYERS

BACKGROUND OF THE INVENTION

It has long been considered desirable to construct batteries in such a manner as to include vents which permit the passage of gases into or out of the battery. In some cases these vents include pervious members which are designed to be selective, to permit the passage of certain gases but not water vapor or to permit the passage of certain gases but not other gases.

It has also been considered desirable to construct batteries with cell enclosures which are impervious to liquids.

U.S. Pat. No. 3,741,814 describes a battery having a pair of wrapper pieces each of which is a laminate; the inner layer is an electrically conductive plastic and the outer layer is a metal. These wrapper pieces, which are components of the cell enclosures, are effective in preventing or severely limiting the venting of liquids, vapors, or gases from the battery.

An application being filed concurrently herewith by Ronald C. Elliott and owned by the assignee of this application describes an improvement in the wrapper of U.S. Pat. No. 3,741,814. The improvement consists of laminating the metal and plastic layers together along with some but not all of their coextensive surfaces, with the unlaminated portions of the two layers providing a passageway between the two layers. After passing through the plastic layer, gases generated inside the battery travel along this passageway and are vented to the exterior of the battery.

U.S. Pat. No. 3,647,557 shows a single cell of block-like configuration sealed in a container which is impervious to liquids, vapors, and gases. A liquid impervious, gas-pervious hollow fiber extends through the container, with an open end of the fiber extending to the outside of the container and a closed loop or sealed end of the fiber disposed inside the space defined by the container. The portion of the fiber positioned inside the cell may be disposed in the liquid electrolyte, in a free space in the container where gas collects, or between the electrodes. A suitable seal is provided around the fiber where the fiber extends through the wall of the container. The fiber permits gases produced inside the cell to be vented to the outside.

Although the use of a hollow, gas-pervious fiber offers advantages as a venting mechanism to relieve gas pressures generated inside batteries, a number of disadvantages of limitations are associated with the construction shown in U.S. Pat. No. 3,647,557. The requirement for a seal where the fiber extends through the container wall limits the construction to materials and configurations in which such a seal is practical. The requirement that a portion of the fiber extend inside the enclosed cell compartment imposes requirements on the properties of the fiber which may be different than if a gas-pervious member is interposed between the fiber and the cell interior. The construction shown in U.S. Pat. No. 3,647,557 is not readily adaptable to multicell batteries, particularly those of thin, flat configurations.

SUMMARY OF THE INVENTION

This invention provides improvements over the constructions shown in U.S. Pat. Nos. 3,741,814 and 3,647,557 and in the Elliott application. This invention is useful in both single cell and multicell batteries, particularly those having thin, flat configurations.

With this invention the cell is confined by a liquid-impervious cell enclosure, one layer of which is pervious to gases generated by the cell. Outside of or embedded in the gas-pervious layer is a passageway through which gases may vent after first passing through the gas-pervious layer.

The passageway may be the interior of a hollow, gas-pervious fiber analogous to those shown in U.S. Pat. No. 2,647,557. Such fibers may be situated between the inner plastic and outer metal layers of the wrapper described in U.S. Pat. No. 3,741,814 and the Elliott application, thereby providing a terminal vent for the battery. The hollow fibers may be alternately situated by being positioned on the interior of a gas-pervious members which serves both as an intercell connector and as a component of the cell enclosure for each of two adjacent cells. The hollow fibers may also be situated within a gas-pervious adhesive which is part of the cell enclosure and which adheres two other members together.

The fibers may also have solid interiors, in which case the venting passageway is outside of the fibers.

The fibers may be of any desired configuration. They may be circular, rectangular, thin and flat, or have other cross-sectional configurations.

The passageway may, as in the Elliott application, be between a gas-pervious inner layer and an outer layer which is impervious to liquids and less pervious than the inner layer to the gases generated by the cell. The passageway between these two layers is occupied by a fiber which, by filling some of the void space, between the inner and outer layers creates a selective vent which makes the passage of small molecules much easier and faster than the passage of large molecules. Preferably this fiber, which may have a solid interior, is not laminated to the layers defining the passageway so that the passage for venting gases is not impeded.

BRIEF DESCRIPTION OF THE DRAWINGS

FIG. 9 is a cross-section of a two-cell battery showing hollow, gas-pervious fibers (i) embedded in gas-pervious layers at the ends of the battery, (ii) embedded in a gas-pervious member which divides the two cells, and (iii) embedded in a gas-pervious adhesive.

FIGS. 10 through 16 are cross-sections showing different internal construction features of the battery and having passageways similar to those shown in FIGS. 2 and 5. Hollow, gas-pervious fibers may be positioned in those passageways.

DESCRIPTION OF THE PREFERRED EMBODIMENTS

Figure 1:
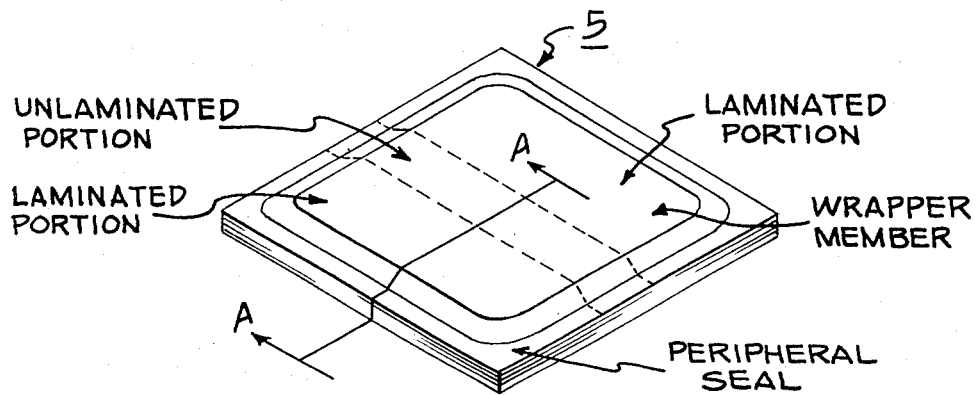
FIG. 1 is a pictorial view of a multicell battery having the venting passageway of this invention.
Figure 2:
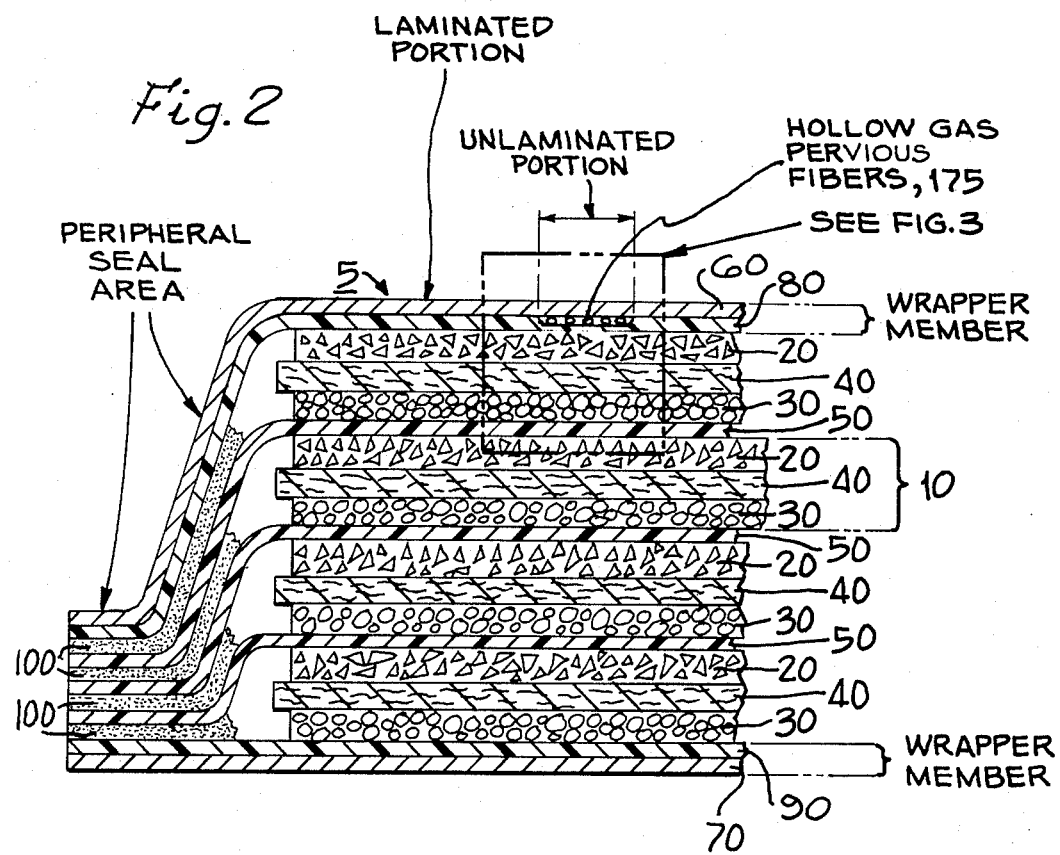
FIG. 2 is a cross-section of the battery shown in FIG. 1 taken along the line A—A of FIG. 1. The thickness of the battery is shown greatly magnified for purposes of illustration.

FIGS. 1 and 2 show in pictorial and cross-sectional views, respectively, a thin, flat battery 5 comprising four cells 10. Each cell 10 comprises a positive electrode 20, a negative electrode 30, and an electrolyte containing layer 40 separating the two electrodes.

Each cell is surrounded and enclosed by a liquid-impervious cell enclosure. The cell enclosure comprises at least one layer which faces the cell and which is pervious to gases generated by the cell. For the top cell shown in FIG. 2, the cell enclosure comprises an electrically conductive, liquid-impervious plastic member 80, an electricallly conductive, liquid-impervious plastic member 50, and an electrically nonconductive, liquid-impervious adhesive 100 which adheres plastic members 80 and 50 together to provide a peripheral seal for the cell. The two interior cells are surrounded by cell enclosures comprising plastic layers 50 and adhesives 100, as shown in FIG. 2. The bottom cell is surrounded by a cell enclosure similar to that which surrounds the top cell, with member 90 also being an electrically conductive, liquid-impervious plastic material. In the construction shown in FIG. 2 the plastic member 80 is required by this invention to be pervious to the gases generated by the cell; the other plastic members 50 and 90 are not required to be, but may be, similarly pervious in the construction shown in FIG. 2.

Figure 3:
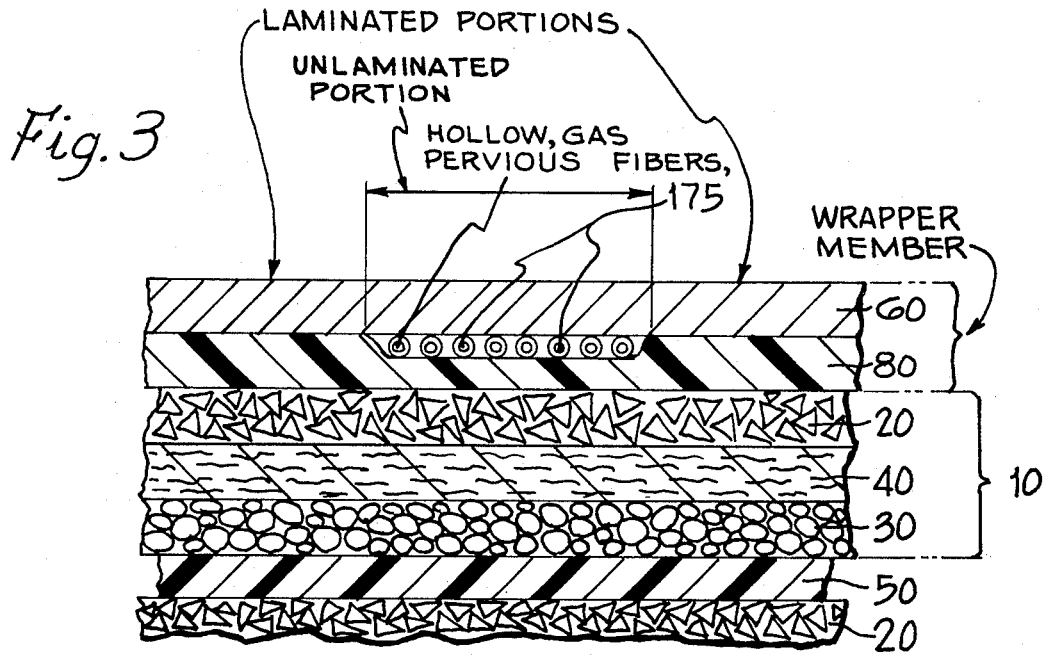
FIG. 3 is an enlargement of part of FIG. 2, showing several hollow, gas-pervious fibers disposed in a passageway between the unlaminated surfaces of a gas-pervious plastic layer and a metal layer.

On the outside of plastic member 80 is a liquid-impervious metal layer 60 which, as in the Elliott application, is laminated to the plastic member 80 at some but not all of their interfacing surfaces. Although not necessarily totally impervious to the gases generated by the cell, the layer 60 is less pervious to such gases than is the plastic layer 80. The unlaminated surfaces provide a passageway between the layers 80 and 60 which, as shown in FIG. 1, communicates with the exterior of the battery and provides a path for the venting of gases. As shown in FIGS. 2 and 3, in this passageway are a plurality of hollow fibers 175 made from a gas-pervious material. There are open spaces in the passageway around the exterior of the fibers 175. Gases which pass through the plastic 80 may travel along the outside and-/or inside of the fibers 175 in the course of being vented from the battery.

Figure 4:
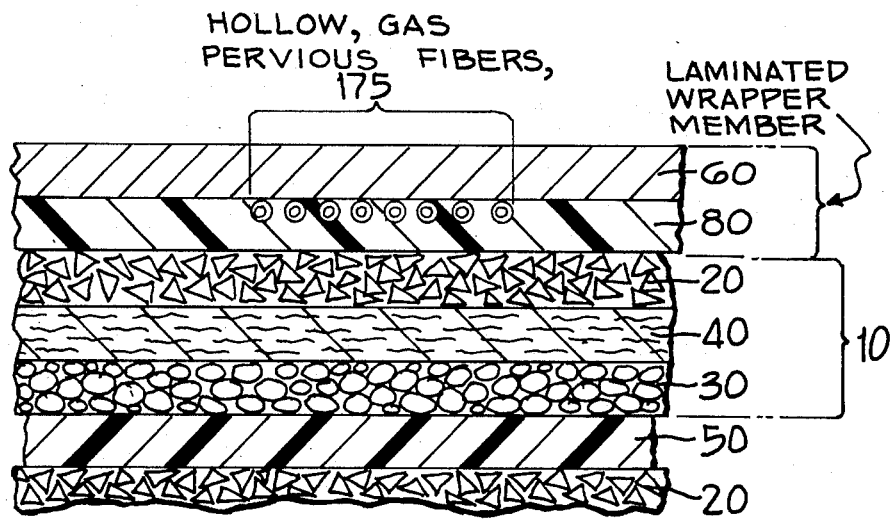
FIG. 4 is an alternative to FIG. 3 in which the fibers are embedded in the plastic and in which there is no void space surrounding the fiber.

FIG. 4 shows a feature which is an alternative in which the fibers 175 are embedded in the plastic 80 and there is no void space surrounding the fibers. The hollow interiors of the fibers 175 provide the passageway through which gases may pass after passing through the plastic 80 and the walls of the fibers 175.

Figure 5:
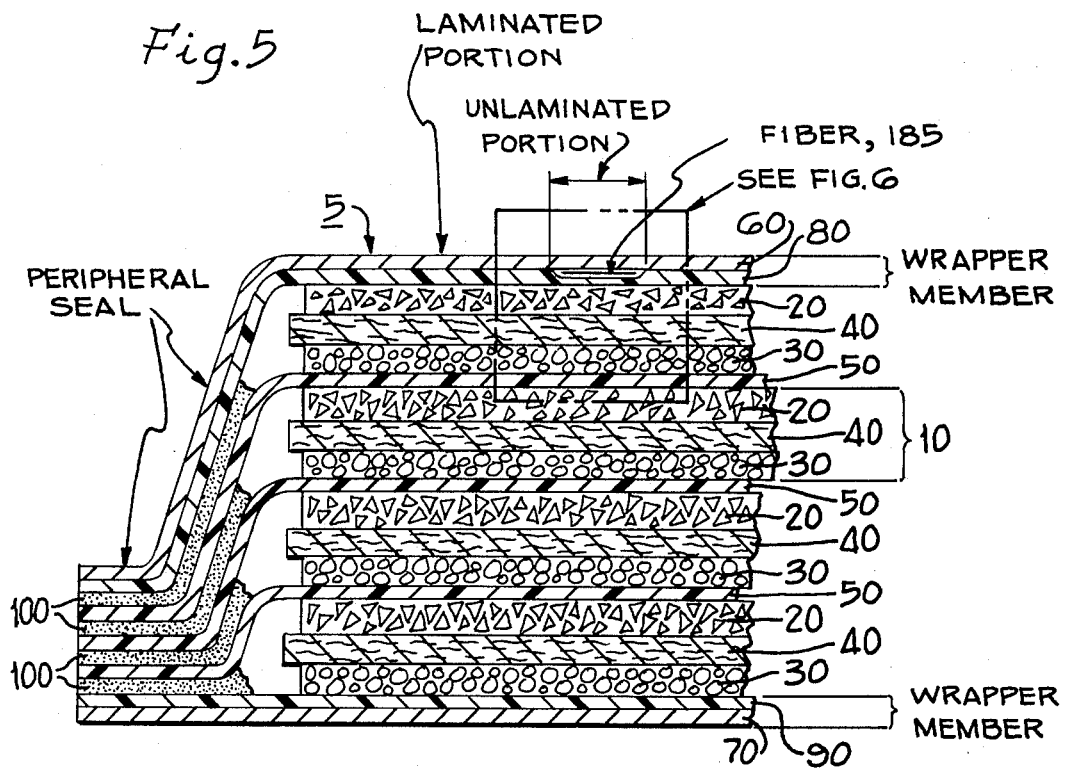
FIG. 5 is similar to FIG. 3 except that it shows a fiber disposed in the passageway between the plastic and metal.
Figure 6:
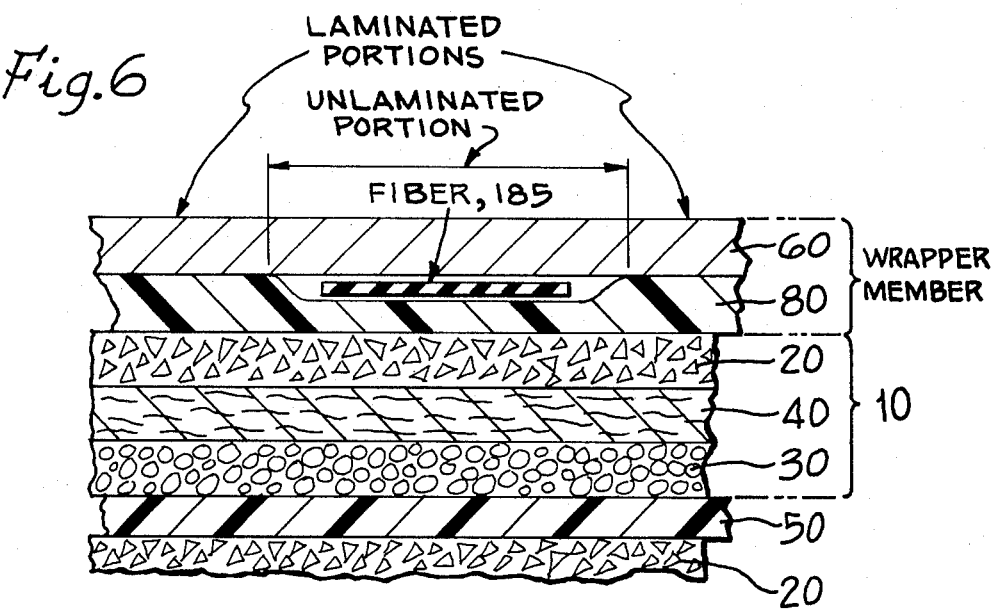
FIG. 6 is an enlargement of a part of FIG. 5.

In the passageway shown in FIGS. 5 and 6 there is a fiber 185 which, unlike the fibers 175, is solid rather than hollow in its interior. While the fiber 185 is shown as thin and flat, the geometric configuration of this fiber is not important and it may be of circular, square, or other cross-sectional configuration. Fiber 185 is distinguished from fiber 175 by being solid in its interior; fiber 185 may or may not be made from a material that is pervious to gases being vented by the battery, and may be made from a variety of materials including fluoropolymers, polyolefins, and polyesters.

One of the functions of the fibers 175 and the only function of the fiber 185 is to produce a selective vent, one which permits the passage of relatively small molecules (e.g., hydrogen gas) faster and more readily than larger molecules (e.g., oxygen, water vapor). This selective venting feature is desirable in several respects. First, although undesired, water vapor may pass through the plastic 80 and vent out through an unrestricted, open passageway, thereby causing the battery to dry out and deteriorate. Oxygen from the air outside the battery may pass through an unrestricted, open passageway, then pass through the plastic 80, and subsequently produce undesirable reactions inside the cell. These problems can be minimized while an adequate venting path for hydrogen gas is maintained by filling some of the void space in the passageway with the fibers 175 or 185.

The effectiveness of the passageways having fibers in the passageways similar to those shown in FIGS. 2, 3, 5, and 6 has been demonstrated.

Figure 7:
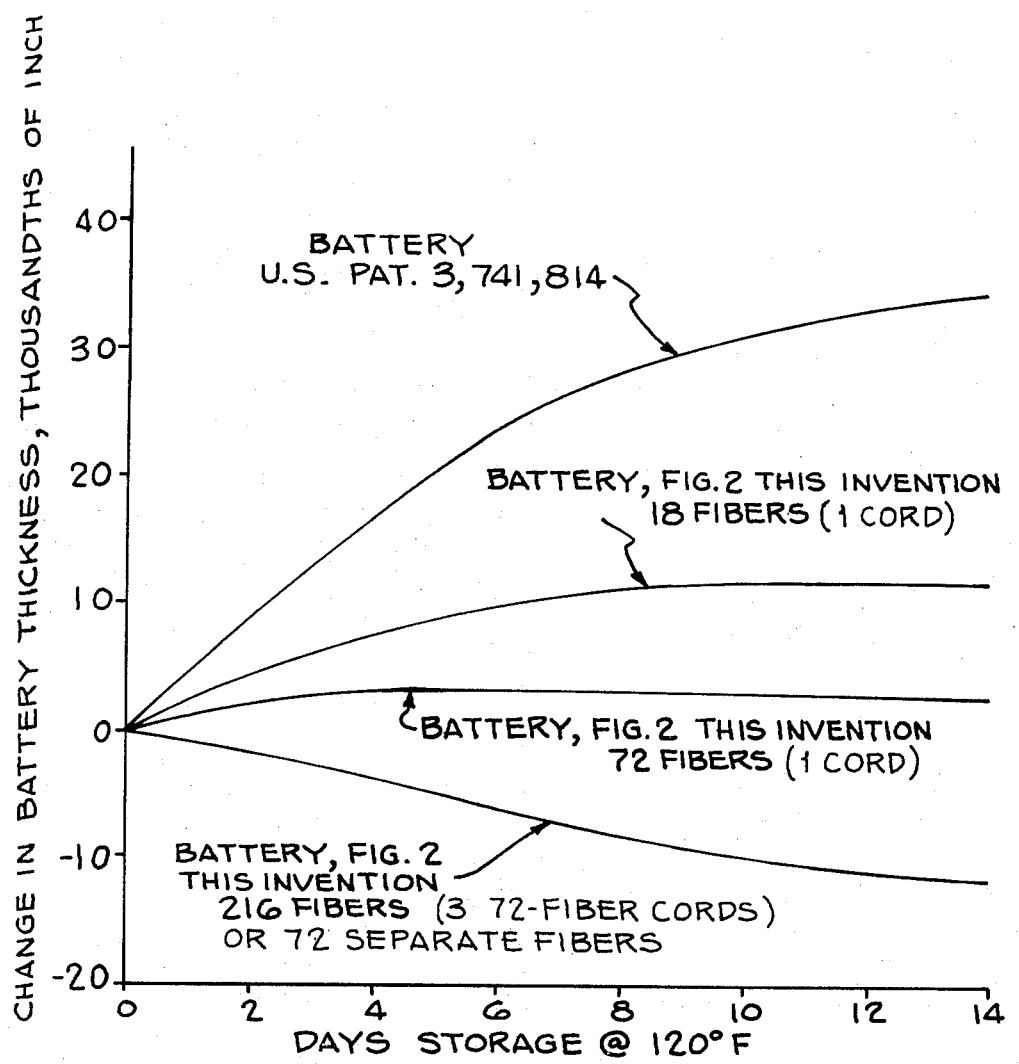
FIG. 7 shows the relative venting abilities of batteries described in U.S. Pat. No. 3,741,814 and batteries having the hollow, gas-pervious fibers in the vents of this invention. Such vents were at both terminals of the battery.

One of the consequences of not permitting the battery to vent adequately is an increase in the thickness of the battery due to internal gas accumulation. FIG. 7 shows how the thickness of a four-cell battery of the type shown in U.S. Pat. No. 3,741,814 (i.e., similar to that shown in FIG. 2 of this application except having no gas passageway or fibers 175) increases with age. FIG. 7 also shows thickness changes in comparable four-cell batteries which have one venting passageway and a plurality of fibers 175 similar to those shown in FIGS. 2 and 3 in both the top and bottom wrapper members (not just the top wrapper member, as shown in FIG. 2). The number of fibers indicated on the individual curves of FIG. 7 represents the number of fibers in each of the two wrapper members. As indicated in FIG. 7, in three constructions the fibers (18, 72, and 216) were clustered in cords, and one battery having three 72-fiber cords in each wrapper produced the same results as another battery having 72 separate fibers in each wrapper. Each of the two wrapper members had a single venting passageway similar to the one shown in FIGS. 1 and 2, the width of the passageway being approximately 0.002 inches. The fibers were of a material identified by the manufacturer, DuPont, by the term "Permasep", and had an outside diameter of approximately $36\mu$ (0.000014inch). The fibers extended the full length of the passageways. FIG. 7 demonstrates the effectiveness of venting passageways, situated outside a gas-pervious plastic layer 80 and confining gas-pervious hollow fibers 175, in venting gases, as evidenced by changes in the thickness of the battery. All batteries represented by the data shown in FIG. 7 had peripheral seals made with a pressure-sensitive adhesive and the tape frame windows shown in U.S. Pat. No. 3,674,565.

Figure 8:
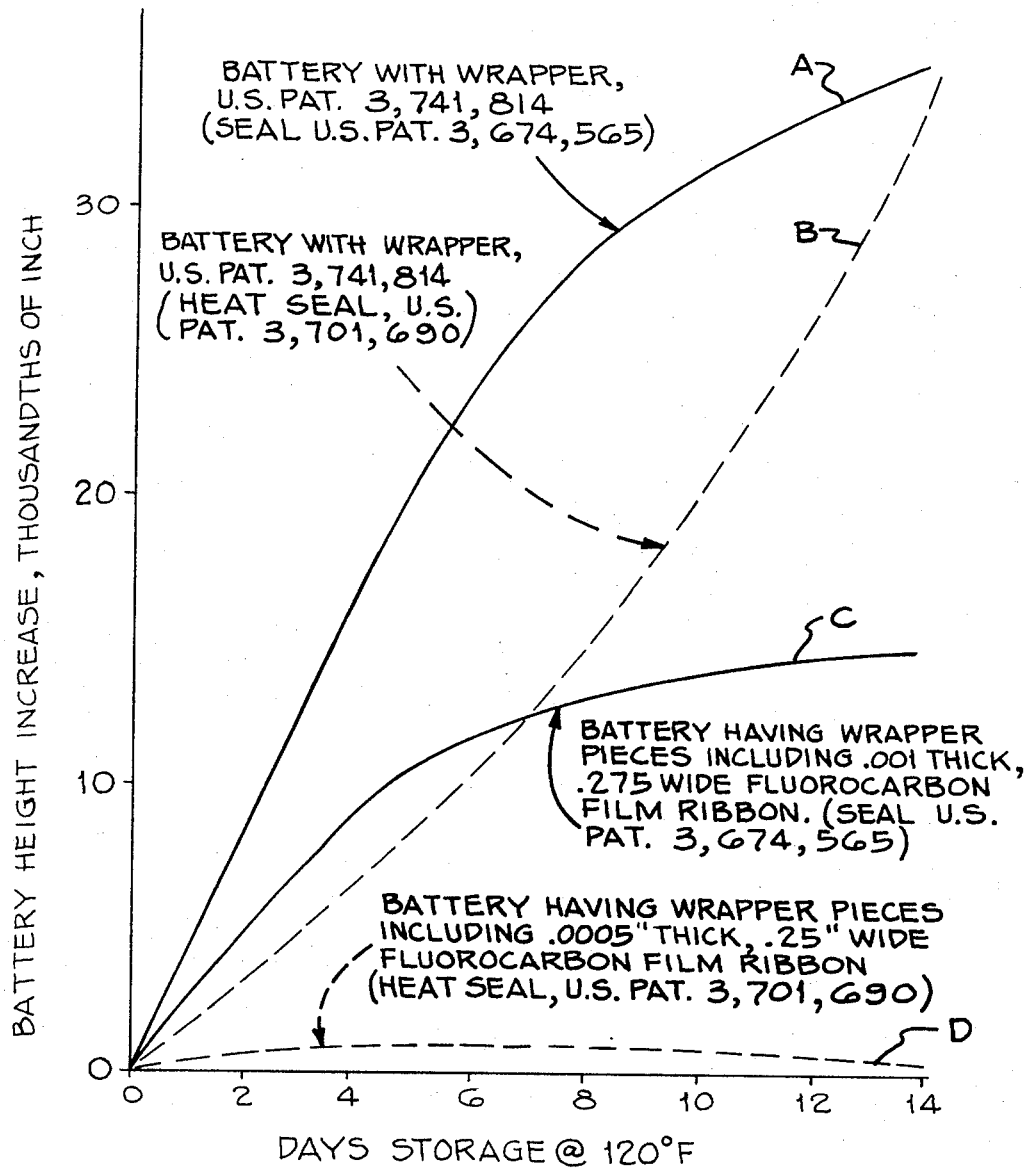
FIG. 8 shows the relative venting abilities of batteries described in U.S. Pat. No. 3,741,814 and batteries having fibers disposed as shown in FIGS. 5 and 6 at both terminals of the battery.

FIG. 8 represents data from four different four-cell battery constructions. Curve A represents a battery without the venting passageways of this invention and with the wrappers described in U.S. Pat. No. 3,741,814 at both the top and bottom; that battery was made with a pressure-sensitive adhesive and the tape frame windows shown in U.S. Pat. No. 3,674,565. Curve B represents a battery comparable to the one represented by Curve A except that the peripheral seals were produced by hot melt adhesives impregnated into extensions of the separator, as described in U.S. Pat. No. 3,701,690. Curve C represents a battery comparable to the one represented by Curve A except that both the top and bottom wrapper members each had one venting passageway and one fiber shown in the top wrapper member in FIGS. 5 and 6; the fiber in each of those passageways was a fluorocarbon film 0.001 inch thick and 0.275 inch wide and identified by its producer, the Plastics Division of Allied Chemical Corporation, by the term "Halar". Curve D represents a battery similar to the one represented by Curve A except that it had peripheral seals produced by hot melt adhesives impregnated into extensions of the separator as shown in U.S. Pat. No. 3,701,690 and except further that both the top and bottom wrapper members each had one venting passageway containing one Halar fiber 0.0005 inch thick and 0.25 inch wide. The batteries represented by Curves C and D contained the venting feature of this invention, whereas those represented by Curves A and B did not. The batteries represented by Curves C and D had passageways which ran the full length of the batteries and vented to the exterior near the edge of the peripheral seal, as shown in FIG. 1, and the Halar fibers ran the full length of the passageways. The widths of the passageways were equal to or only slightly greater than the widths of the Halar fibers. The passageways may have been partially closed or constricted to some extent in the area above the peripheral seals, but they were open enough to permit gases generated by the cells to vent to the exterior of the battery. The fibers were not laminated to either the inner plastic layers 80 and 90 or to the outer metal layers 60 and 70.

In each of the batteries represented by test data in FIG. 7 and 8, the initial thickness of the four-cell battery before the start of storage was approximately 0.120 inch. Of this total, each cell (combination of a positive electrode 20, negative electrode 30, and electrolyte-containing separator layer 40) was approximately 0.022 inch thick, each electrically conductive plastic member 80, 90, and 50 was approximately 0.002 inch thick, and the metal layers 60 and 70 were approximately 0.002 inch thick. The remaining thickness of approximately 0.018 inch represented air trapped in the battery.

FIG. 9 illustrates a two-cell battery having hollow, gas-pervious fibers 175 located in three different cell enclosure members, (i) embedded in the gas-pervious, electrically conductive plastic layers 80 and 90 at the ends of the battery, (ii) embedded in the gas-pervious, electrically conductive plastic layer 50 which divides the two cells and which serves as a cell enclosure and gas-venting member for each cell, and (iii) embedded in a gas-pervious, electrically nonconductive adhesive 100 which is a cell enclosure member and which seals the plastic layers together. The electrolyte containing separator layer 40 could be extended into the peripheral seal area and be impregnated with adhesive as described in U.S. Pat. No. 3,701,690 if desired.

It will be noted that, in accordance with the requirements of this invention, the passageways which comprise or confine the hollow, gas-pervious fibers 175 or 185 are beyond the inside face of the gas-pervious layer 80, 90, 50, or 100 of the cell enclosure. The result is that the passageway is situated so that gases can travel through the passageway only by first passing through the gas-pervious layer. The placement of the gas-pervious layer between the interior of the cell and the passageway will affect the rate at which gases are vented. It will be noted also that this placement prevents the fibers from coming into direct contact with the electrochemically active members of the cell. The constructions shown in the drawings and described above have gas-venting passageways which do not require an opening in the cell enclosure member and a gas-tight seal around that seal.

To function as required by this invention the layer situated between the interior of the cell and the gas-venting passageway may be pervious to certain gases. The layer may function by a mechanism in which the gases are dissolved and diffused in the layer. The rate at which particular gas molecules which must pass through the layer, or be prevented from passing through, should be considered taking into account the particular electrochemical system included in the cell. With cell systems in which an oxidizing compound is contained inside the cell, the usual desired result is to vent gases produced by discharge from the inside to the outside of the cell. The layer must have the property of being pervious to certain gases but impervious to liquids. Plastic materials having this property include polyvinyl chloride, polyethylene, ethyl cellulose, and other polymeric materials. Palladium-silver alloys and other metals and metallic alloys have this property. Most if not all adhesives display this characteristic.

The layers 60 and 70 must be impervious to liquids and less pervious than the inner layers 80 and 90 to the gases generated by the cell (although not necessarily impervious to all gases per se). Many metals and some plastics will have this property.

Laminations between the inner plastic and outer metal layers may be achieved in a number of ways including heat laminations. Alternatively, the lamination may be achieved through the use of some adhesive material positioned between the layers. To achieve the unlaminated portions of the venting wrapper member, the heat and/or intermediate adhesive may be omitted over the affected area, and any pressure applied elsewhere to produce lamination may be omitted or reduced. Where the lamination is produced using heat, the fibers should preferably have a surface energy which is sufficiently low to prevent them from being laminated to either the plastic or metal layers.

The number, widths, lengths, and configurations of the unlaminated portions of the wrapper member can be optimized only by experiment. The optimum will depend upon a number of factors, taken in combination with each other, such as: the size, solubility, and/or diffusion rate of the gas molecules to be vented; the rate at which the gas molecules are to be vented during storage, intentional discharge, or recharge of the battery in a particular environment; the properties of the gas-pervious layer, which affect the ease or difficulty with which the gases will pass through that layer; and the ease or difficulty with which the gases pass along the unlaminated passageway, a consideration which will be affected by the clearance at the interface between the two unlaminated surfaces as well as the surface properties of the two layers at that interface. For the sake of simplicity in explaining the invention the drawings illustrate a single unlaminated gas passageway running in a straight line along the center of the battery and extending from and opening at opposite exterior edges of the battery; this embodiment is intended only to be illustrative of a great many alternatives, all of which are within the scope of this invention, in which there are numerous variations and combinations of the factors described above and of the number, width, length, and configuration of the gas passageways. The passageways may be partially closed by peripheral sealing steps.

While FIG. 1 shows the gas-venting passageway extending to the edge of the battery and into the area of the peripheral seal, this feature is not a requirement of this invention. The opening of the passageway to the atmosphere outside the battery may be located at any convenient position, including inside or beyond the peripheral seal.

FIGS. 10 through 16 show cross-sections of batteries having different internal construction features. Each of the batteries shown in FIGS. 10 through 16 had a passageway similar to those shown in FIGS. 2 and 5, but for the sake of simplicity the fibers 175 or 185 have not been shown.

In FIG. 10 the intercell connector layers 50 comprise pieces of electrically nonconductive plastic 51 through holes in which an electrically conductive material 53 extends to provide electrical conductivity between the positive electrode 20 of one cell and the negative electrode 30 of the adajcent cell. The nonconductive plastic components 51 are extended beyond the edges of the electrodes to be heat sealed with each other and with the layers 80 and 90 of the wrapper members to produce the peripheral seal. The upper and lower wrapper members shown in FIG. 10 are identical with those shown in FIG. 2.

In FIG. 11 the multicell battery 5 is provided with negative electrodes 30 comprising strips of electrochemically reactive metal 52 (e.g., zinc) some of which extend beyond the edges of the positive electrodes 20 and the electrolyte-containing layers 40. The intercell connector layers comprise deposits of electrically conductive, electrochemically nonreactive material 56 which also extends beyond the edges of the positive electrodes 20 and the electrolyte-containing layers 40. Deposits of electrically non-conductive adhesive 100 are used as shown to provide peripheral seals around each cell by sealing with the layers 80, 90, 52 and 56. The upper and lower wrapper members shown in FIG. 11 are identical with those shown in FIGS. 2 and 10.

The battery 5 shown in FIG. 12 compries only a single sell and has an upper wrapper member identical with the one shown in FIG. 2. The lower wrapper member, which extends beyond the positive electrode 20 and electrolyte-containing layer 40 to be sealed with nonconductive adhesive 100 and provide the peripheral seal, comprises a sheet or strip of electrochemically reactive metal (e.g., zinc) the inner surface of which is used as the cell's negative electrode.

Figure 13:
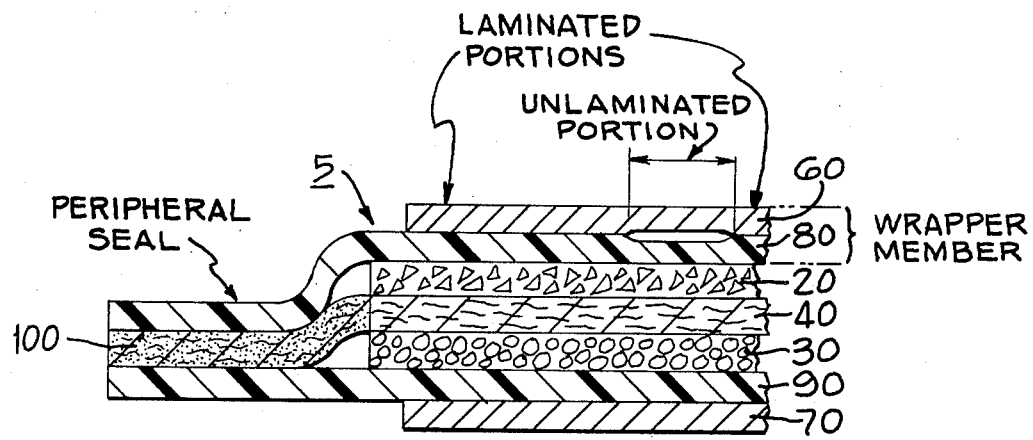

The single cell battery 5 shown in cross-section in FIG. 13 has upper and lower wrapper members comprising inner layers of electrically conductive plastic 80 and 90, respectively, and outer layers of metal 60 and 70 respectively. The conductive plastic layers 80 and 90, but not the metal layers 60 and 70, extend beyond the edges of the electrodes and are used as components of the peripheral seal together with a deposit of electrically nonconductive adhesive 100 impregnated into an extension of the separator 40. The upper wrapper member contains laminated and unlaminated portions similar to those appearing in FIG. 2 to provide the required gas vent or passageway.

Figure 14:
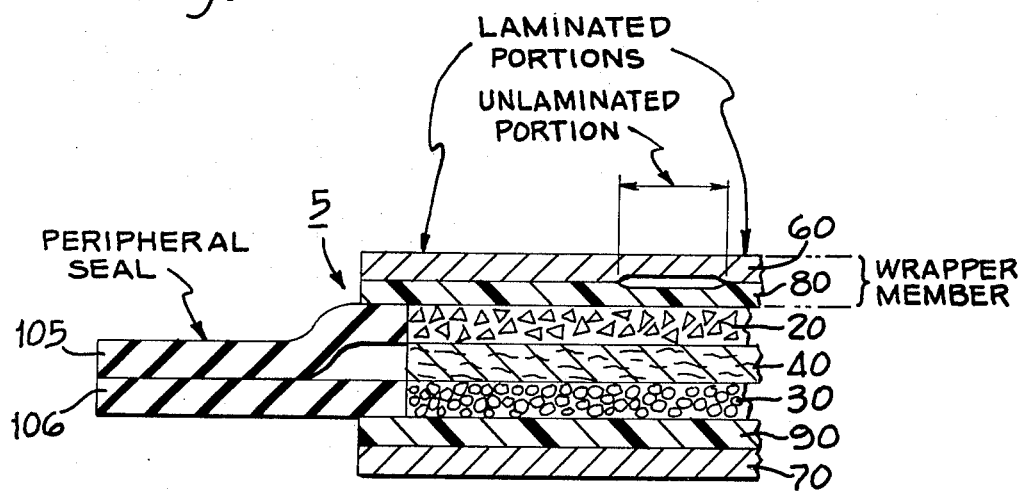

The single cell battery 5 shown in cross-section in FIG. 14 has upper and lower wrapper members comprising electrically conductive, gas-pervious plastic layers 80 and 90, respectively, and metal layers 60 and 70, respectively. The surfaces of the layers 80 and 90 are coextensive with the surfaces of layers 60 and 70, respectively. The innermost surfaces of layers 80 and 90 extend beyond the edges of the electrodes 20 and 30 where they are heat sealed to electrically nonconductive members 105 and 106, respectively, and those members 105 and 106 are in turn extended further outward and heat sealed together to provide the peripheral seal. The upper wrapper member contains laminated and unlaminated portions similar to those appearing in FIG. 2 to provide the required gas vent or passageway.

Figure 15:
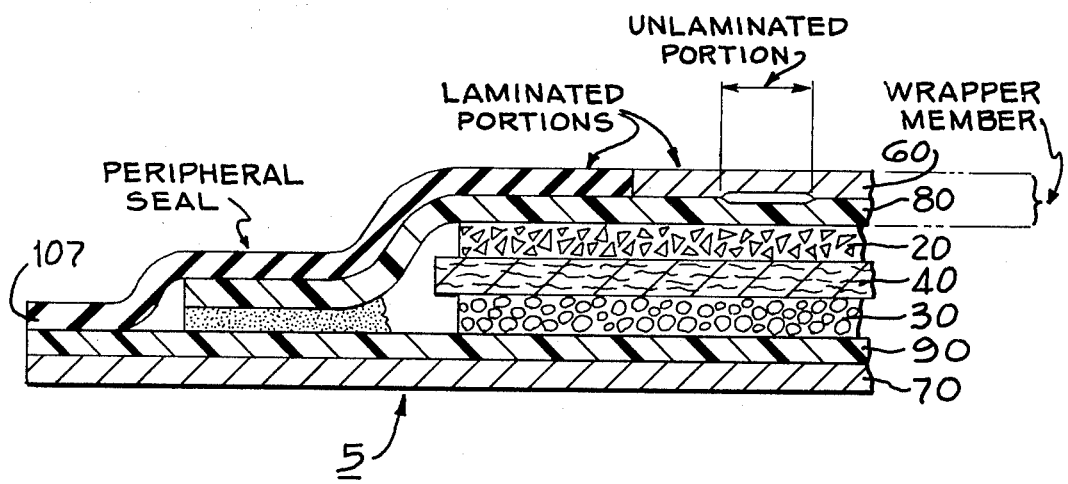

The single cell battery 5 shown in cross-section in FIG. 15 has a lower wrapper member similar to that shown in FIG. 2 and which is sealed with the upper wrapper member by an electrically nonconductive adhesive 100 to provide the peripheral seal. The upper wrapper member has an inner layer 80 made from a gas-pervious, electrically conductive plastic material. The outer layers of the upper wrapper member include an open-centered component 107 made from an electrically nonconductive material and a centrally located layer of metal 60, both of which are relatively gas-impervious. All of the inner surface of the component 107 is laminated to the top of layer 80, while some but not all of the metal layer 60 is laminated to the top of layer 80. The required gas vent or passageway is between metal layer 60 and plastic layer 80, as in FIG. 2. The construction shown in FIG. 8 has the characteristic of requiring less metal 60 and exposing a smaller conductive area than the layers 70, 90, and 107 have been extended beyond the edges of layer 80 and adhesive 100 so that layers 107 and 90 may be sealed together and produce an additional peripheral seal.

Figure 16:
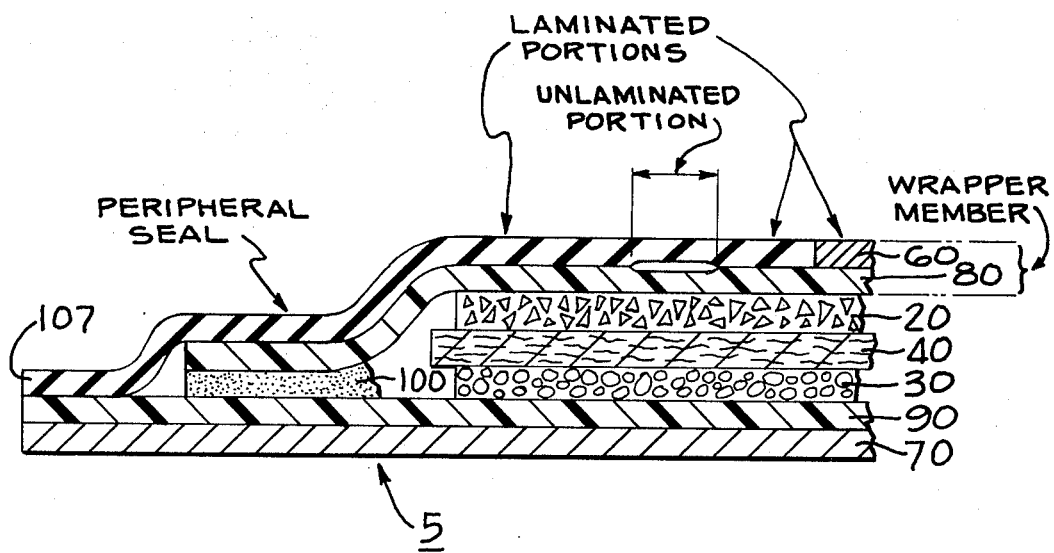

FIG. 16 shows a battery similar to the one appearing in FIG. 15 except that the unlaminated portion of the upper wrapper member which provides the required gas passageway occurs between layer 80 and layer 107. The construction shown in FIG. 16 has the characteristic of having the metal layer 60 and the conductive plastic layer 80 be laminated together across the entire interface of their coextensive surfaces, thereby minimizing the electrical resistance between those two layers.

The battery 5 of this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may with appropriate electrodes employ the electrolytes commonly used in the LeClanche system (ammonium chloride and/or zinc chloride), various alkaline electrolytes such as the hydroxides of potassium, sodium, and/or lithium, acidic electrodes such as sulfuric or phosphoric acid, nonaqueous electrolytes, the electrolytes of course being chosen to be compatible with the positive and negative electrodes.

Among the wide variety of electrochemical systems which may be used in the battery 5 are those in which the positive electrodes comprise manganese dioxide, the negative electrodes comprise metals such as zinc, aluminum, or magnesium, the electrolytes substantially comprise an acidic solution of inorganic salts. Another commonly known system useful in the battery 5 is the alkaline manganese system in which the positive electrodes comprise manganese dioxide, the negative electrodes comprise zinc, and the electrolyte substantially comprises a solution of potassium hydroxide. Other aqueous electrolyte systems including those of nickel-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

We claim:
1. An improvement in a battery having
    a. at least one cell comprising
        i. a positive electrode,
        ii. a negative electrode, and
        iii. a electrolyte-containing layer separating the two electrodes, and
    b. a cell terminal member in contact with the outside face of one of the end electrodes and providing a terminal therefor, the cell terminal member comprising an electrically conductive, liquid impervious plastic inner layer which is pervious to the gases generated by the cell,
wherein the improvement provides a gas-venting passageway, the passageway comprising
    c. a hollow fiber made from a material which is pervious to the gases to be vented from the cell, the fiber being situated beyond the inside face of the gas-pervious inner layer so that gases generated by the cell must first pass through the inner layer before reaching the fiber, the hollow interior of the fiber communicating with the exterior of the battery.

2. The battery of claim 1 wherein the cell terminal member comprises the combination of the inner layer and an outer layer, the outer layer being less pervious than the inner layer to the gases generated by the cell, the hollow fiber being situated between the cell and the outer layer.

3. The battery of claim 1 in which the cell terminal member is sealed around the periphery of the cell and in which the hollow fiber extends into and communicates with the exterior of the battery near the peripheral seal.

4. The battery of claim 1 wherein the cell terminal member comprises the combination of the inner layer and an outer layer, the outer layer being less pervious than the inner layer to the gases generated by the cell, the inner and outer layers being laminated together at some but not all of their interfacing surfaces, the hollow fiber being situated between the unlaminated surfaces of the inner and outer layers.

5. The battery of claim 4 in which the cell terminal member is sealed around the periphery of the cell and in which the hollow fiber extends into and communicates with the exterior of the battery near the peripheral seal.

6. An improvement in a battery having
    a. at least one cell comprising
        i. a positive electrode,
        ii. a negative electrode, and
        iii. an electrolyte-containing layer separating the two electrodes, and
    b. a cell enclosure member extending around a portion of the cell and comprising the combination of
        i. an inner layer which faces the cell and which is pervious to gases generated by the cell and
        ii. an outer layer which is less pervious than the inner layer to the gases generated by the cell,
wherein the improvement provides a gas-venting passageway, the improvement comprising
    c. a lamination between some but not all of the interfacing surfaces of the inner and outer layers, the unlaminated surfaces of the two layers defining a passageway which communicates with the exterior of the battery, the passageway being situated beyond the inside face of the inner member so that gases generated by the cell must first pass through the inner layer before reaching the passageway, and
    d. a fiber disposed in the passageway.

7. The battery of claim 6 in which the fiber has a hollow interior and in which the fiber is made from a material which is pervious to the gases to be vented from the cell.

8. The battery of claim 6 in which the fiber has a solid interior.

9. The battery of claim 7 in which the fiber is laminated to the inner and/or the outer layers.

10. The battery of claim 8 in which the fiber is laminated to the inner and/or the outer layers.

11. The battery of claim 7 in which the fiber is not laminated to either the inner or outer layers.

12. The battery of claim 8 in which the fiber is not laminated to either the inner or outer layers.

13. The battery of claim 6 in which the cell enclosure and the fiber are situated on the outside face of an end cell of the battery, thereby providing a terminal vent for the battery.

14. The battery of claim 13 in which the cell enclosure is sealed around the peripheral of the cell and in which the passageway extends into and communicates with the exterior of the battery near the peripheral seal.

15. The battery of claim 11 in which the cell enclosure and the fiber are situated on the outside face of an end cell of the battery, thereby providing a terminal vent for the battery.

16. The battery of claim 15 in which the cell enclosure is sealed around the periphery of the cell and in which the passageway extends into and communicates with the exterior of the battery near the peripheral seal.

17. The battery of claim 12 in which the cell enclosure and the fiber are situated on the outside face of an end cell on the battery, thereby providing a terminal vent for the battery.

18. The battery of claim 17 in which the cell enclosure is sealed around the periphery of the cell and in which the passageway extends into and communicates with the exterior of the battery near the peripheral seal.

19. An improvement in a battery comprising at least two cells separated from one another by an intercell connector member which is in electrical contact with the positive electrode of one cell and the negative electrode of another cell and which intercell connector member comprises an electrically conductive, liquid impervious plastic which is pervious to the gases generated by the cell, wherein the improvement provides a gas-venting passageway in the intercell connector member and between the cells, the passageway comprising a hollow fiber made from a material which is pervious to the gases generated by the cell, the hollow fiber being situated on the interior of the intercell connector member so that gases must first pass through the electrically conductive plastic before reaching the fiber.

* * * * *